(12) United States Patent
Fuchs et al.

(10) Patent No.: US 12,325,486 B2
(45) Date of Patent: Jun. 10, 2025

(54) SNOW VEHICLE

(71) Applicant: Polaris Industries Inc., Medina, MN (US)

(72) Inventors: Michael Fuchs, Medina, MN (US); Cody Telford, Sandpoint, ID (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 18/488,542

(22) Filed: Oct. 17, 2023

(65) Prior Publication Data

US 2024/0043092 A1 Feb. 8, 2024

Related U.S. Application Data

(62) Division of application No. 16/995,960, filed on Aug. 18, 2020, now Pat. No. 11,814,136.

(60) Provisional application No. 62/889,349, filed on Aug. 20, 2019.

(51) Int. Cl.
*B62M 27/02* (2006.01)

(52) U.S. Cl.
CPC ....... *B62M 27/02* (2013.01); *B62M 2027/023* (2013.01); *B62M 2027/025* (2013.01); *B62M 2027/026* (2013.01); *B62M 2027/027* (2013.01); *B62M 2027/028* (2013.01)

(58) Field of Classification Search
CPC ............ B62M 27/02; B62M 2027/021; B62M 2027/022; B62M 2027/023; B62M 2027/025; B62M 2027/026; B62M 2027/027; B62M 2027/028

USPC ........................................................ 180/190
See application file for complete search history.

(56) References Cited

U.S. PATENT DOCUMENTS

| 3,252,533 A | 5/1966 | Aeder et al. |
| 3,630,301 A | 12/1971 | Henricks |
| 3,822,755 A | 7/1974 | Hine |
| 4,434,867 A | 3/1984 | Grinde |
| 4,437,534 A | 3/1984 | Grinde |

(Continued)

FOREIGN PATENT DOCUMENTS

| CA | 2228188 A1 | 7/1998 |
| CA | 2441643 A1 | 4/2004 |

(Continued)

OTHER PUBLICATIONS

Canadian Office Action dated Sep. 28, 2021 in corresponding Canadian Application No. 3091610.

(Continued)

*Primary Examiner* — Anne Marie M Boehler
(74) *Attorney, Agent, or Firm* — Merchant & Gould P.C

(57) ABSTRACT

A snow vehicle includes a frame comprising an upper frame portion and a lower frame portion, a handlebar comprising a handlebar axis, said handlebar coupled to said upper frame portion and said lower frame portion and a tunnel comprising having a driven track shaft and a track rotatably coupled to the driven track shaft within the tunnel. A two-stroke engine includes a crankshaft and a tuned pipe coupled to the engine. The engine and the tuned pipe are positioned between the handlebar axis and the driven track shaft. A continuously variable transmission is disposed between the handlebar axis, the upper frame portion of the frame and the lower frame portion.

18 Claims, 15 Drawing Sheets

(56) References Cited

U.S. PATENT DOCUMENTS

| | | |
|---|---|---|
| 4,442,913 A | 4/1984 | Grinde |
| 4,502,560 A * | 3/1985 | Hisatomi ............... B62M 27/02 |
| | | 305/128 |
| 4,613,006 A | 9/1986 | Moss et al. |
| 4,699,229 A | 10/1987 | Hirose et al. |
| 4,823,903 A | 4/1989 | Bibollet et al. |
| 5,064,208 A | 11/1991 | Bibollet |
| 5,203,424 A | 4/1993 | Gogo et al. |
| 5,474,146 A | 12/1995 | Yoshioka et al. |
| 5,586,614 A | 12/1996 | Kouchi et al. |
| 5,738,361 A | 4/1998 | Landucci |
| 5,881,834 A | 3/1999 | Karpik |
| 5,904,217 A | 5/1999 | Yamamoto et al. |
| 6,112,840 A | 9/2000 | Forbes |
| 6,164,670 A | 12/2000 | Abarca et al. |
| 6,234,263 B1 * | 5/2001 | Boivin ............... B62K 21/00 |
| | | 180/184 |
| 6,321,864 B1 | 11/2001 | Forbes |
| 6,470,987 B1 | 10/2002 | Friend |
| 6,478,098 B2 | 11/2002 | Boivin et al. |
| 6,494,548 B2 | 12/2002 | Courtemanche |
| 6,505,896 B1 | 1/2003 | Boivin et al. |
| 6,863,142 B2 | 3/2005 | Corbeil |
| 6,889,787 B2 | 5/2005 | Karpik |
| 7,182,165 B1 | 2/2007 | Keinath et al. |
| 7,318,494 B2 | 1/2008 | Takahiko et al. |
| 7,357,201 B2 | 4/2008 | Jordan |
| 7,475,751 B2 | 1/2009 | Pard et al. |
| D612,766 S | 3/2010 | Boivin |
| 7,789,183 B2 | 9/2010 | Sadakuni et al. |
| 7,896,362 B1 | 3/2011 | Scatchard |
| 7,975,794 B2 | 7/2011 | Simmons |
| 8,167,073 B2 | 5/2012 | Polakowski et al. |
| 8,240,782 B2 | 8/2012 | Bessette et al. |
| 8,297,383 B2 | 10/2012 | Despres |
| 8,430,197 B2 | 4/2013 | Matsudo |
| 8,739,913 B2 | 6/2014 | Rivard |
| 8,813,889 B1 | 8/2014 | Jorgenson |
| 8,820,458 B2 | 9/2014 | Giese |
| 8,910,738 B2 | 12/2014 | Mangum |
| 9,174,702 B1 | 11/2015 | Gauthier et al. |
| 9,290,216 B2 | 3/2016 | Fairhead |
| 9,346,518 B2 | 5/2016 | Polakowski et al. |
| 9,358,999 B2 | 6/2016 | Nadeau |
| 9,469,327 B2 | 10/2016 | Anderson et al. |
| 9,731,746 B2 | 8/2017 | Hodgson et al. |
| 9,751,552 B2 | 9/2017 | Mangum et al. |
| 9,783,263 B2 | 10/2017 | Bedard et al. |
| 9,878,750 B2 | 1/2018 | Leblanc et al. |
| 9,988,067 B1 | 6/2018 | Mangum et al. |
| 10,005,506 B2 | 6/2018 | Muehlfeld et al. |
| 10,293,883 B1 | 5/2019 | Bedard et al. |
| 10,442,494 B2 * | 10/2019 | Thompson ............. B62M 27/02 |
| 11,814,136 B2 * | 11/2023 | Fuchs ................... B62M 27/02 |
| 2004/0007914 A1 | 1/2004 | Lemieux |
| 2015/0144412 A1 | 5/2015 | Mangum |
| 2015/0259032 A1 | 9/2015 | Mangum |
| 2016/0280331 A1 | 9/2016 | Mangum |
| 2017/0057573 A1 | 3/2017 | Gentry |
| 2017/0066502 A1 * | 3/2017 | Will ..................... B62D 55/12 |
| 2017/0129570 A1 | 5/2017 | Mangum et al. |
| 2017/0305487 A1 * | 10/2017 | Lefebvre ................. B62J 35/00 |
| 2018/0111662 A1 | 4/2018 | Ball |
| 2018/0186430 A1 | 7/2018 | Vigen |
| 2018/0244326 A1 | 8/2018 | Zuchoski |
| 2018/0251168 A1 * | 9/2018 | Mangum ............... B62M 27/02 |
| 2018/0273142 A1 | 9/2018 | Mangum et al. |
| 2019/0084643 A1 | 3/2019 | Thompson et al. |
| 2019/0118904 A1 | 4/2019 | LeBlanc |
| 2019/0144074 A1 | 5/2019 | Vigen |
| 2022/0111914 A1 | 4/2022 | Aubut et al. |
| 2024/0034434 A1 * | 2/2024 | Thompson ............. B62M 27/02 |

FOREIGN PATENT DOCUMENTS

| | | |
|---|---|---|
| CA | 2555039 C | 12/2009 |
| CA | 2902973 C | 10/2016 |
| CA | 3009002 C | 1/2019 |
| CN | 101417687 B | 6/2010 |
| CN | 201941937 U | 8/2011 |
| CN | 102060073 B | 4/2013 |
| DE | 202010004838 U1 | 7/2010 |
| EP | 391282 A2 | 10/1990 |
| EP | 997372 A2 | 5/2000 |
| EP | 1056639 B1 | 6/2003 |
| EP | 1433693 A2 | 6/2004 |
| EP | 994016 B1 | 12/2004 |
| EP | 1905684 B1 | 11/2012 |
| EP | 2855236 A1 | 4/2015 |
| EP | 2387527 B1 | 9/2015 |
| EP | 3172123 A1 | 5/2017 |
| JP | 2696239 B2 | 1/1998 |
| JP | 2754033 B2 | 5/1998 |
| JP | 3189288 B2 | 7/2001 |
| WO | WO-200402811 A1 | 1/2004 |
| WO | WO-201878198 A1 | 5/2018 |

OTHER PUBLICATIONS

Canadian Office Action dated Mar. 31, 2022 in corresponding Canadian Application No. 3091610 (7 pages).

* cited by examiner

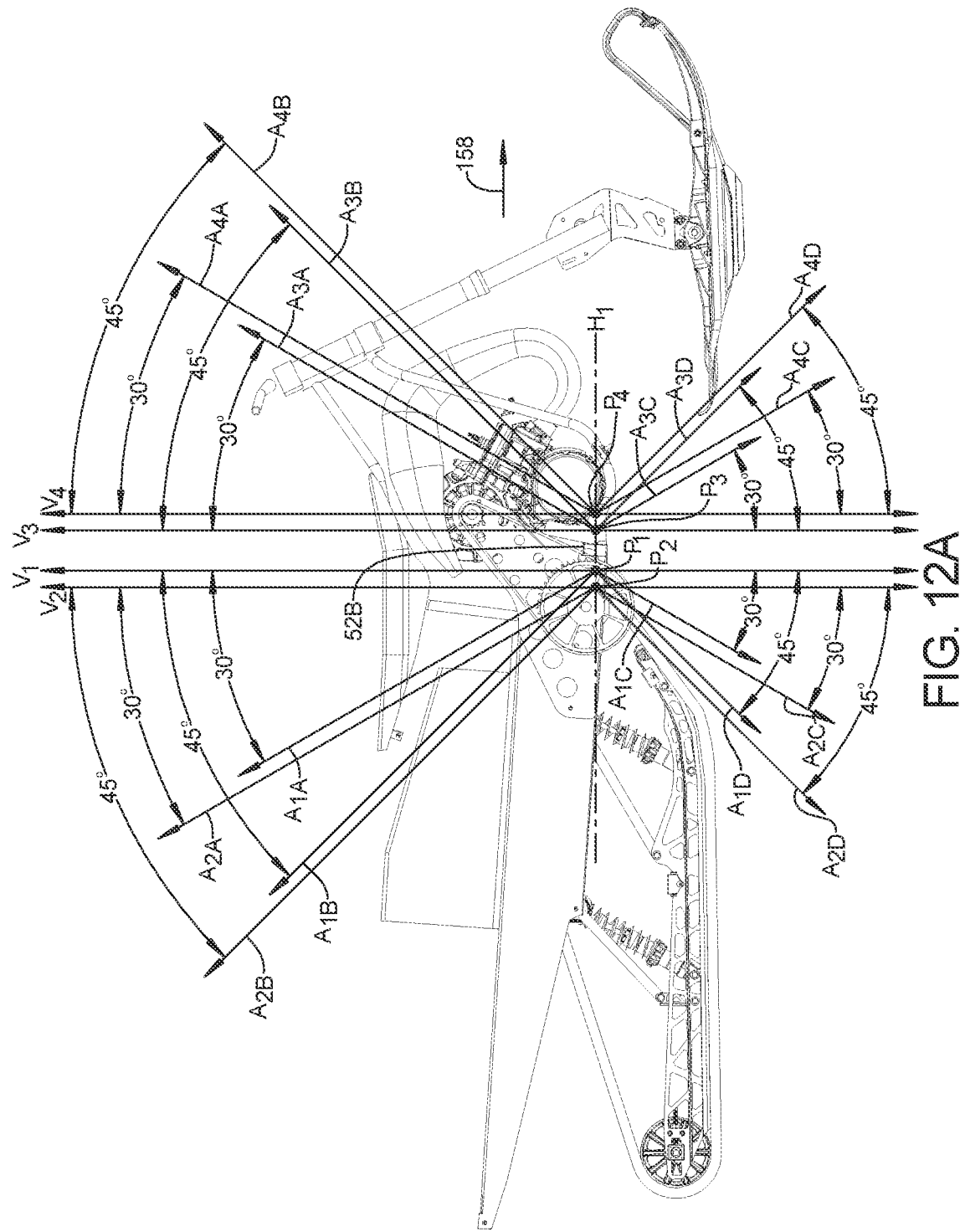

SNOW VEHICLE

CROSS-REFERENCE TO RELATED APPLICATIONS

This application is a divisional of U.S. patent application Ser. No. 16/995,960 filed on Aug. 18, 2020, which claims the benefit of U.S. Provisional Application No. 62/889,349, filed on Aug. 20, 2019. The entire disclosures of the above applications are incorporated herein by reference.

FIELD

The present disclosure relates to a snow vehicle and, more particularly, to relative positions of components of the snow vehicle.

BACKGROUND

This section provides background information related to the present disclosure which is not necessarily prior art.

Snow vehicles such as snow bikes are becoming increasingly popular. Snow bikes allow a rider to reach areas that a snowmobile typically cannot reach. For example, steep inclines and back country trails may not be accessible by a snowmobile. Snow bikes more easily ride through off-trail areas because they are narrow and allow traversing of narrow spaces. Snow bikes can traverse bumpy areas. Snow bikes also allow the quick turning capability for backcountry riding.

Timbersled® is one brand of snow bike kit by Polaris Industries Inc. Typically, a Timbersled® brand snow bike kit allows a user to convert a motorcycle into a Timbersled® vehicle by installing a front ski and a rear track. The rear track resembles a track for a snowmobile, but is often narrower. The benefit of a snow bike is that year round use of many of the motorcycle parts are reused in a snow bike. However, the installation of kits require many hours for installation A motorcycle engine is typically designed for operating in warmer climates and at low elevations. A snow bike, however, may be used in high altitudes and extremely low temperatures. Therefore, the engines may not operate at operate optimally. Further, the weight distribution of a motorcycle that has been converted to a snow bike may also not have handling characteristics that are optimized for operating in the snow.

SUMMARY

This section provides a general summary of the disclosures, and is not a comprehensive disclosure of its full scope or all of its features.

The snow bike set forth herein includes a configuration suitable for operating in high altitudes, low temperatures and has improved handling characteristics from prior known vehicles.

In one aspect of the disclosure, a snow vehicle includes a frame comprising an upper frame portion and a lower frame portion, a handlebar comprising a handlebar axis, said handlebar coupled to said upper frame portion and said lower frame portion and a tunnel comprising having a driven track shaft and a track rotatably coupled to the driven track shaft within the tunnel. A two-stroke engine includes a crankshaft and a tuned pipe coupled to the engine. The engine and the tuned pipe are positioned between the handlebar axis and the driven track shaft. A continuously variable transmission is disposed between the handlebar axis, the upper frame portion of the frame and the lower frame portion.

In another aspect of the disclosure, a snow vehicle includes a frame assembly and a tunnel coupled to the frame assembly. The tunnel has an upper surface defining a plane. An engine has a crankshaft axis disposed below the plane of the upper surface of the tunnel.

In yet another aspect of the disclosure, a snow vehicle includes a frame comprising an upper portion and a lower portion and a handlebar rotatably coupled to the frame comprising a handlebar axis. The handlebar is coupled to the upper frame portion and said lower frame portion. The handlebar is coupled to a ski. The ski has a ski width. A tunnel has a driven track shaft that is rotatably coupled to the track shaft within the tunnel. The track has a track width about as wide as the ski width.

In another aspect of the disclosure, a snow vehicle incudes a frame comprising an upper frame portion and a lower frame portion and a handlebar comprising a handlebar axis. The handlebar is coupled to the upper frame portion and the lower frame portion. A tunnel has a driven track shaft and a track rotatably coupled to the track shaft within the tunnel. A two-stroke engine comprises a crankshaft and a tuned pipe. The engine and the tuned pipe are positioned entirely between the upper frame portion and the lower frame portion laterally.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

FIG. 12A is a side view of a vehicle having a primary leg position illustrated thereon.

DETAILED DESCRIPTION

Figure 1:
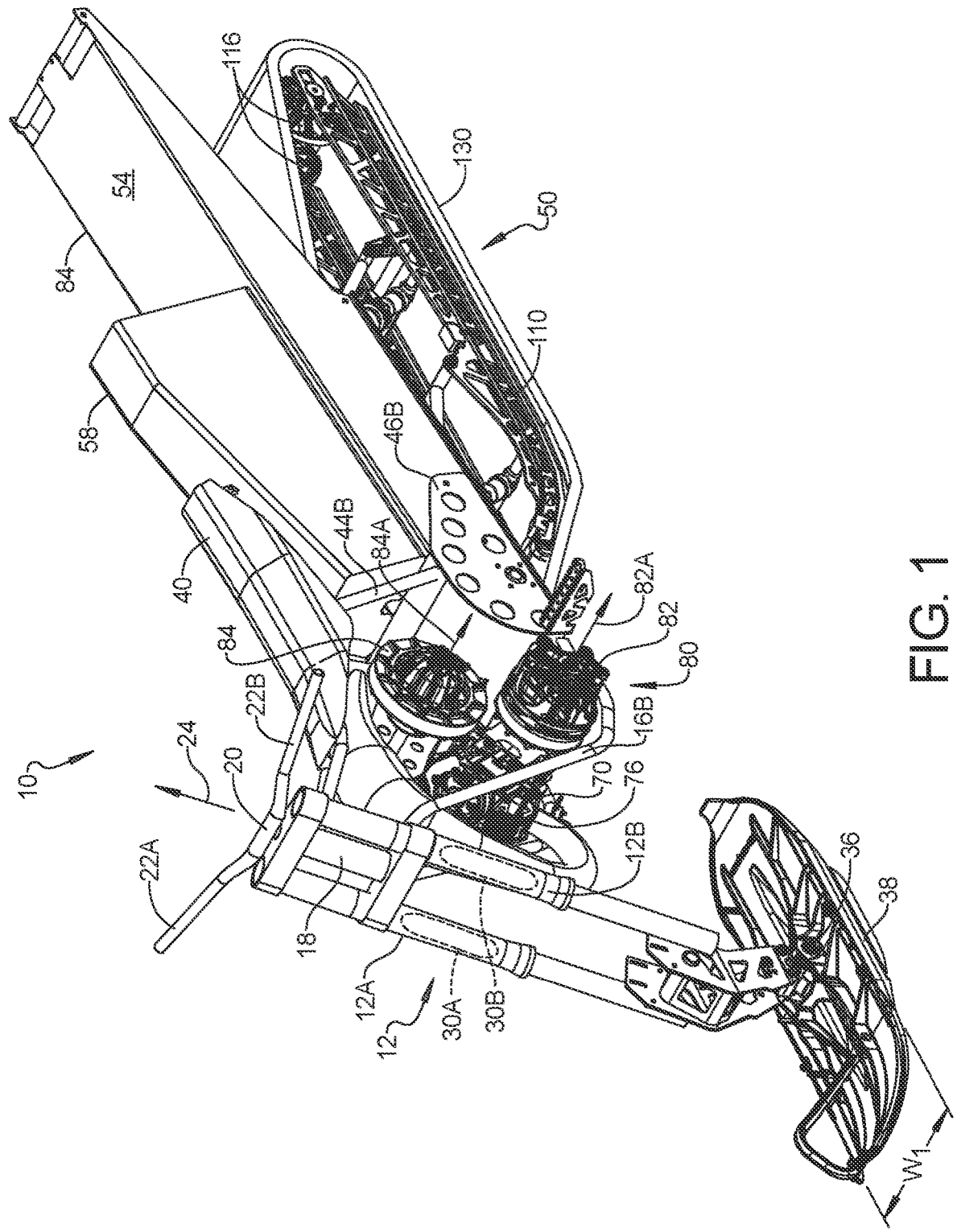
FIG. 1 is a left side perspective view of the snow vehicle according to the present disclosure.
Figure 2:
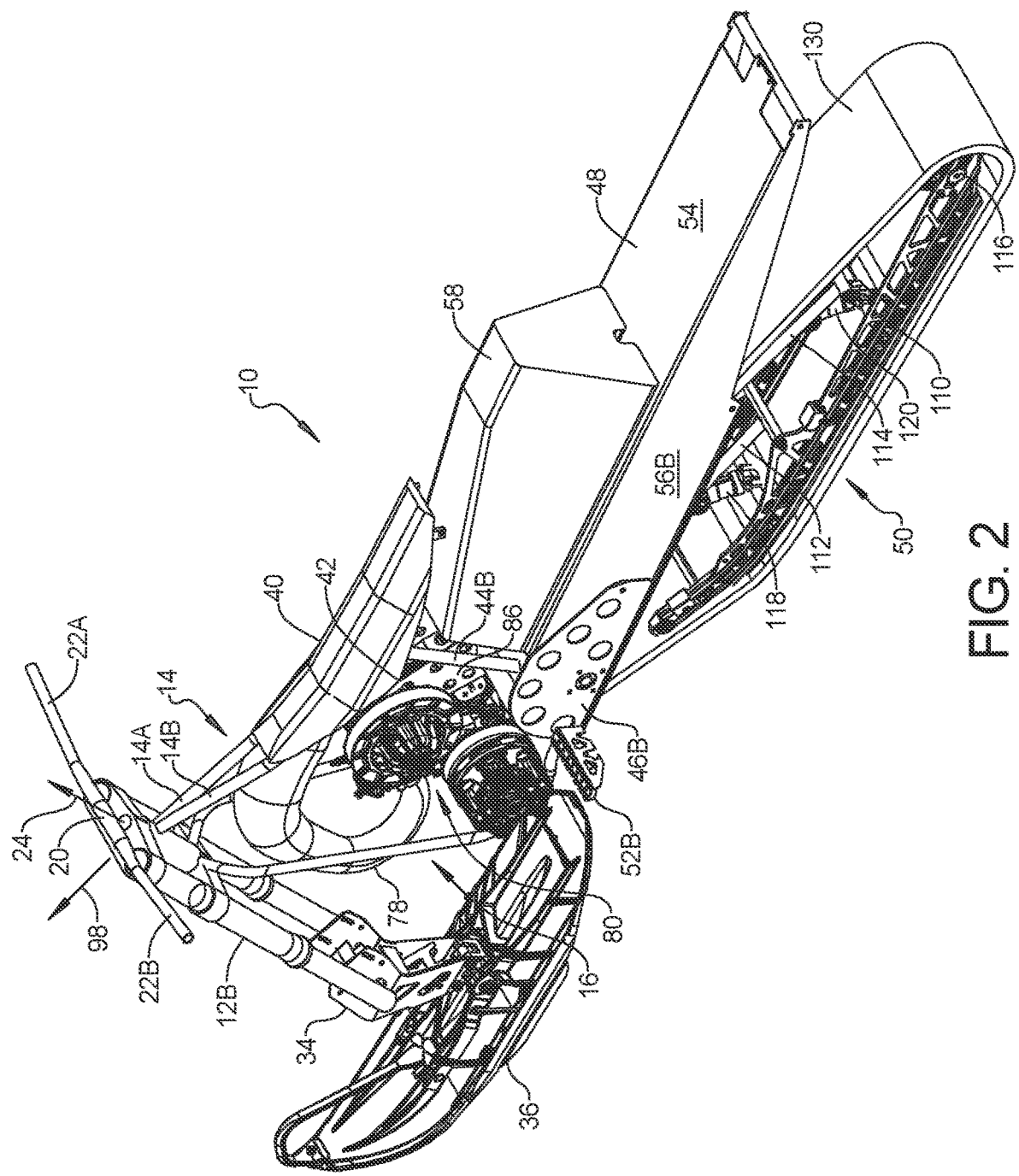
FIG. 2 is a rear left side view of the snow vehicle according to the present disclosure.
Figure 3:
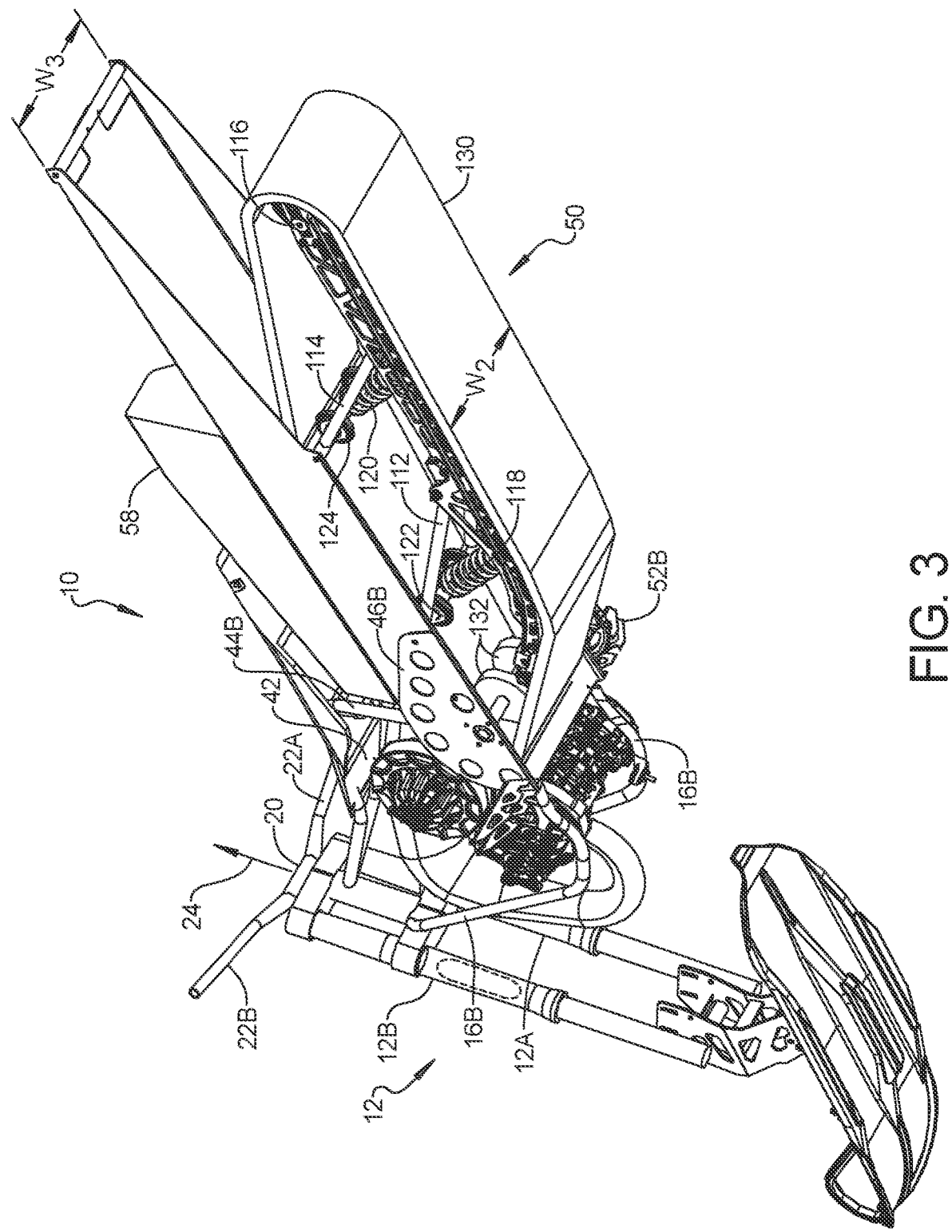
FIG. 3 is an under left side view of the snow vehicle according to the present disclosure.
Figure 4:
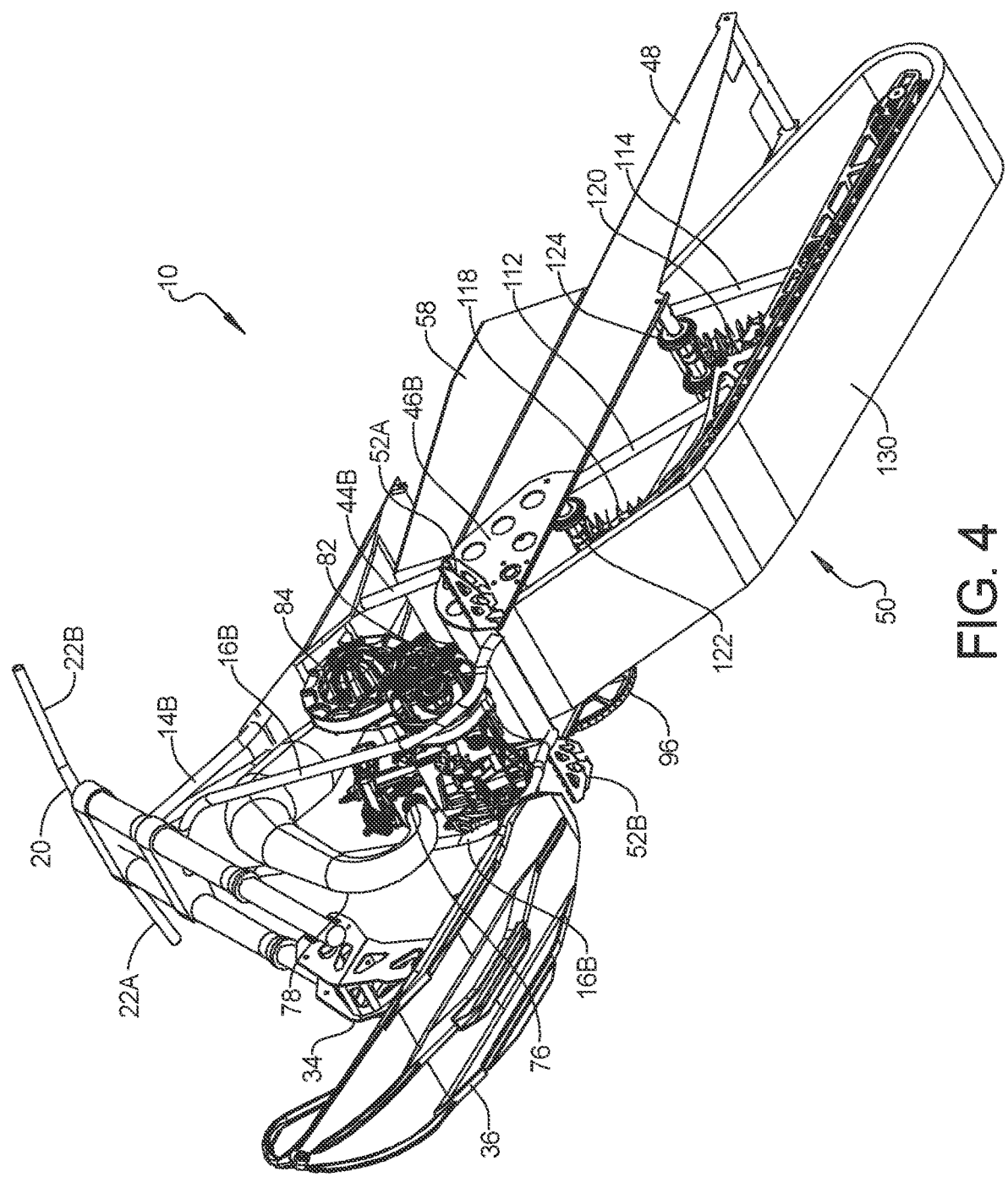
FIG. 4 is a under left side view of the snow vehicle according to the present disclosure.

Examples will now be described more fully with reference to the accompanying drawings. The examples disclosed below are not intended to be exhaustive or to limit the disclosure to the precise forms disclosed in the following detailed description. Rather, the examples are chosen and described so that others skilled in the art may utilize their teachings.

The following description is set forth for a snow vehicle. Various terms such as above, below, in front or behind are provided with reference to a snow bike that s disposed on a level surface and is the upright position. The term width refers to a dimension lateral to the snow bike perpendicular to the longitudinal axis and the normal direction of travel of the snow bike.

Referring now to FIGS. 1-9A, a snow vehicle 10 is illustrated that allows for improved handling characteristics. The snow vehicle 10 includes a fork assembly 12 that is rotatably mounted to a frame that comprises an upper frame 14 that has a first upper frame member 14A and a second upper frame member 14B. The fork assembly 12 is also coupled to a lower frame 16 that includes a first lower frame member 16A and a second lower member 16B. The steering mount 18 is coupled between the upper frame 14 and the lower frame 16. The steering mount 18 allows the fork assembly 12 to rotate therearound.

The fork assembly 12 rotates under the control of the vehicle operator through the handlebar 20. The handlebar 20 includes a first hand grip 22A and a second hand grip 22B on the right side and left side of the snow vehicle 10, respectively. The steering mount 18 causes the handlebar 20 to rotate about a handlebar axis 24.

The fork assembly 12 may include a first fork 12A and second fork 12B. The forks 12A and 12B may include a shock absorber 30A and 30B illustrated in FIGS. 1 and 3.

The forks 12A and 12B are coupled to a spindle 34. The spindle 34 couples the forks 12A, 12B to a ski 36. The ski 36 may pivot about an axis defined by the ski connection bolt 38. The width of the ski $W_1$ is suitable for traversing through different types of snow conditions.

The upper frame 14, although it is illustrated as a pair of framed members, may also be comprised of a single frame member. The upper frame members 14A and 14B are used to support a seat 40. The seat 40 may be coupled to the upper frame members 14A, 14B with a seat support 42. The seat support 42 may be a separate component than the first upper frame member 14A and a lower frame member 16B. However, the first upper frame member 14A and a second upper frame member 14B may continue underneath the seat 40 to provide the seat support 42. In this example, a separate seat support 42 is provided. The seat support 42 is coupled to a first upright frame member 44A and a second upright frame member 448. The upright frame members 44A and 44B may also be a continuation of the first upper frame member 14A and the second upper frame member 14B. The upright frame members 14A and 14B and the lower frame members 16A and 168 are coupled to side panels 46A, 46B. The side panels 46A and 46B are used to secure the tunnel 48 thereto. The tunnel 48 is used to secure the track assembly 50 to the snow vehicle 10.

The side panels 46A and 46B may also be used to secure a foot peg 52A and 52B to the snow vehicle 10. The position of the foot pegs 52A and 52B may vary. However, the foot pegs 52A, 52B, hi this example, are mounted forward of the upright frame members 44A and 44B at or near the location where the first lower frame member 16A and the second lower frame member 16B attach to the side panels 46A and 46B, respectively.

The tunnel 48 has an upper surface 54 that is planar and two side surfaces 56A and 56B which are vertical in this example. The upper surface 54, in this example, is used to secure a fuel tank 58 thereto. However, the fuel tank 58 may also be located in a different location as described below.

The snow vehicle 10 also includes an engine 70 that is mounted to the lower frame members 16A and 16B. The engine 70 has a crankshaft 72 disposed therein. The crankshaft 72 forms a crankshaft axis about which the piston rod rotates. The engine 70 also includes a sparkplug 74. In this example, a single sparkplug for a single cylinder two-stroke engine 70 is set forth. However, more than one cylinder may be included in the engine 70. Further, the engine 70 may also be a four-stroke engine. The engine 70 has an exhaust port 76 that faces the front of the snow vehicle 10. The exhaust port 76 is coupled to a tuned pipe 78. The tuned pipe 78 extends between the first lower frame member 16A and lower frame member 16B. The tuned pipe 78 has a first curved portion 78A that curves upward. A second curved portion 78B turns the tuned pipe 78 toward the rear of the snow vehicle 10, The end of the tuned pipe 780 extends below the first upper frame member 14A and the second upper frame member 14B and below the seat 40. The tuned pipe 78 is tuned to provide the optimum feedback to the engine 70. The curved portion 78B of the tuned pipe 78 may extend the tuned pipe 78 between the first lower frame member 16A and the second lower frame member 16B. The tuned pipe 78 may also be coupled to a muffler or silencer.

A transmission 80 is coupled to the engine 70. The transmission 80, in this example, is a continuously variable transmission. The transmission 80 includes a primary clutch 82 and secondary clutch 84 that are coupled together through a belt (not shown). The primary clutch 82 has an axis of rotation 82A that corresponds to the axis of rotation of the crankshaft or the crankshaft axis. The secondary clutch 84 also has an axis of rotation 84A. The secondary clutch 84 may be mounted to the tunnel 48 and/or one of the side panels 46A, 46B through a support 86.

Figure 5:
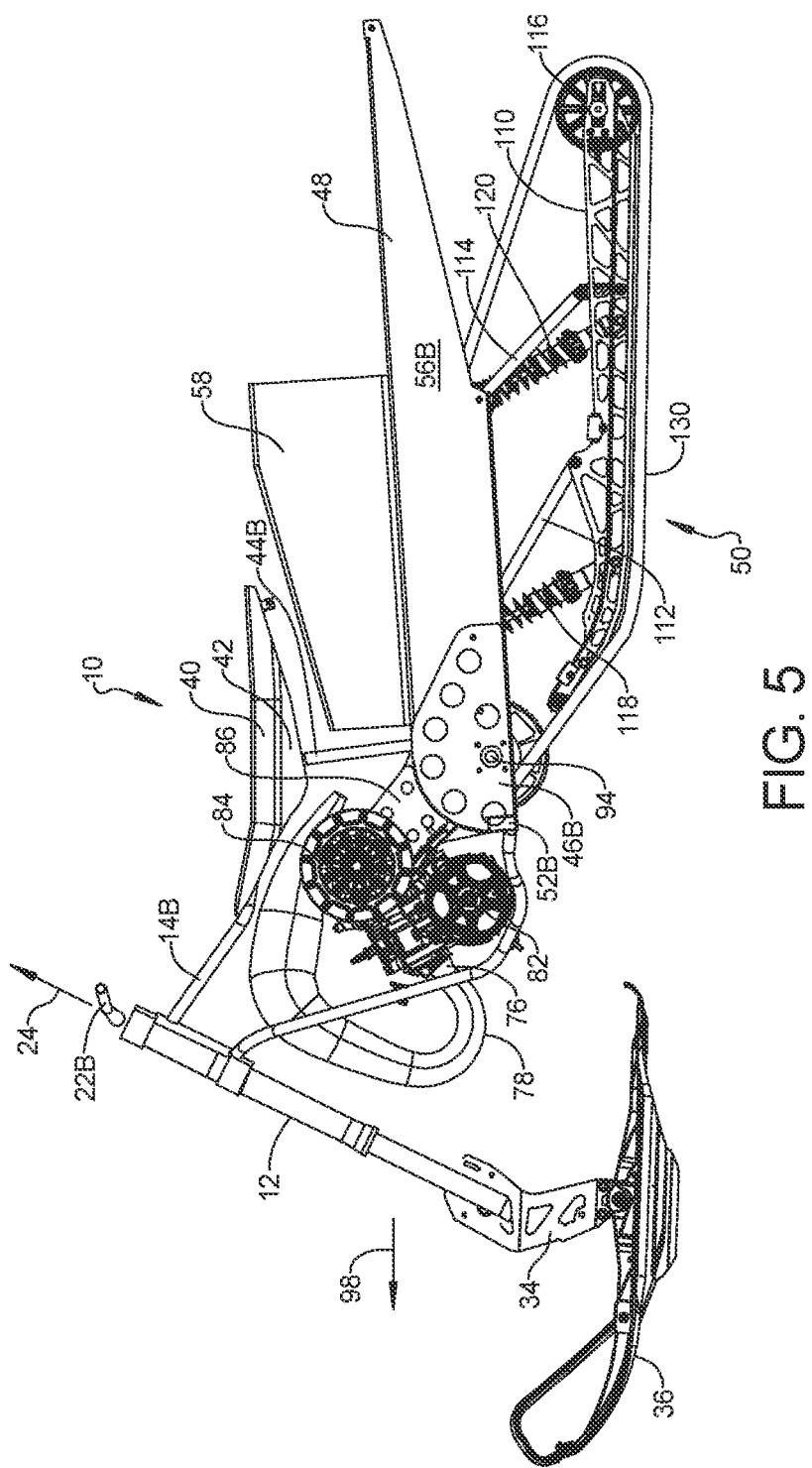
FIG. 5 is a left side view of the snow vehicle according to the present disclosure.

As is best illustrated in FIG. 5, a center of gravity box 89A is set forth. The center of gravity box in this example is centered about the driven track shaft 94. The center of gravity may be located within the box 89A which extends about 10 inches forward and 10 inches rearward of the driven track shaft 94. That is, the horizontal extent of the placement of the center of gravity extends longitudinal 20 inches centered about the driven track shaft 94. The vertical extent of the placement of the center of gravity may be about 10 inches above and about 10 inches below the driven track shaft 94.

Alternatively, the center of gravity may be positioned in a second box 89B that extends 2 inches toward and 2 inches rearward of the driven track shaft 94. Box 89B also extends about 10 inches above the driven track shaft and about 10 inches below the driven track shaft. By providing the center of gravity within one of the boxes 89A, 89B, improve riding and handling characteristics are achieved.

Figure 6:
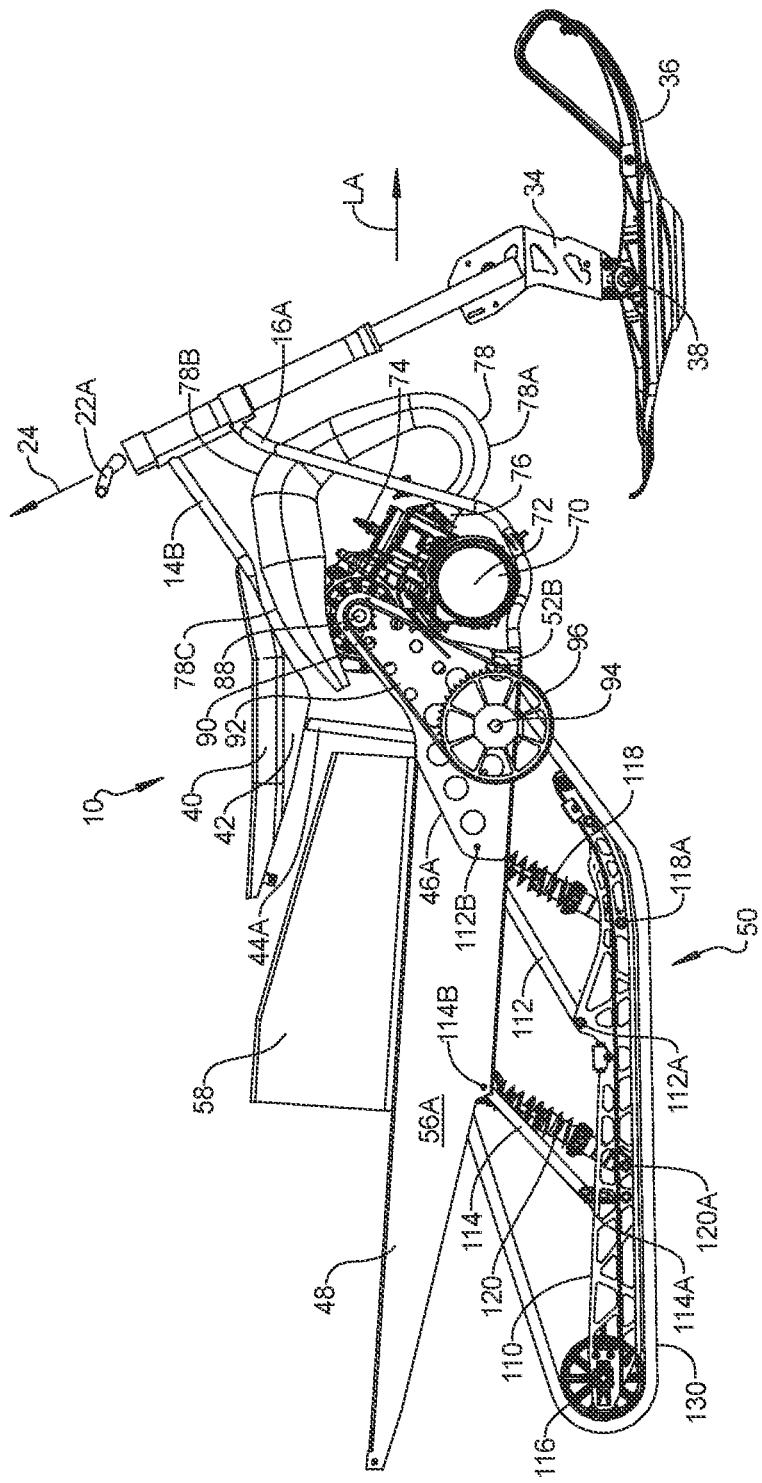
FIG. 6 is a right side view of the snow vehicle according to the present disclosure.
Figure 7:
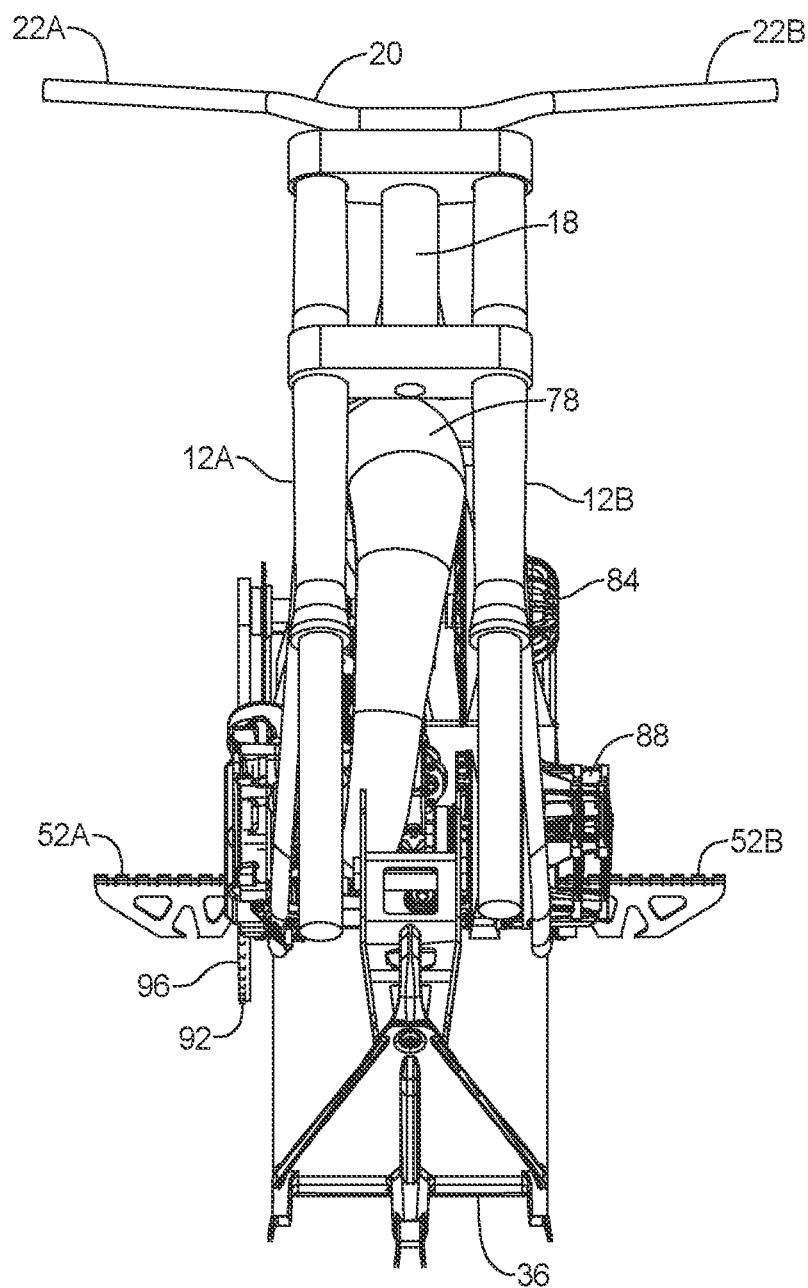
FIG. 7 is a front side view of the snow vehicle according to the present disclosure.
Figure 8:
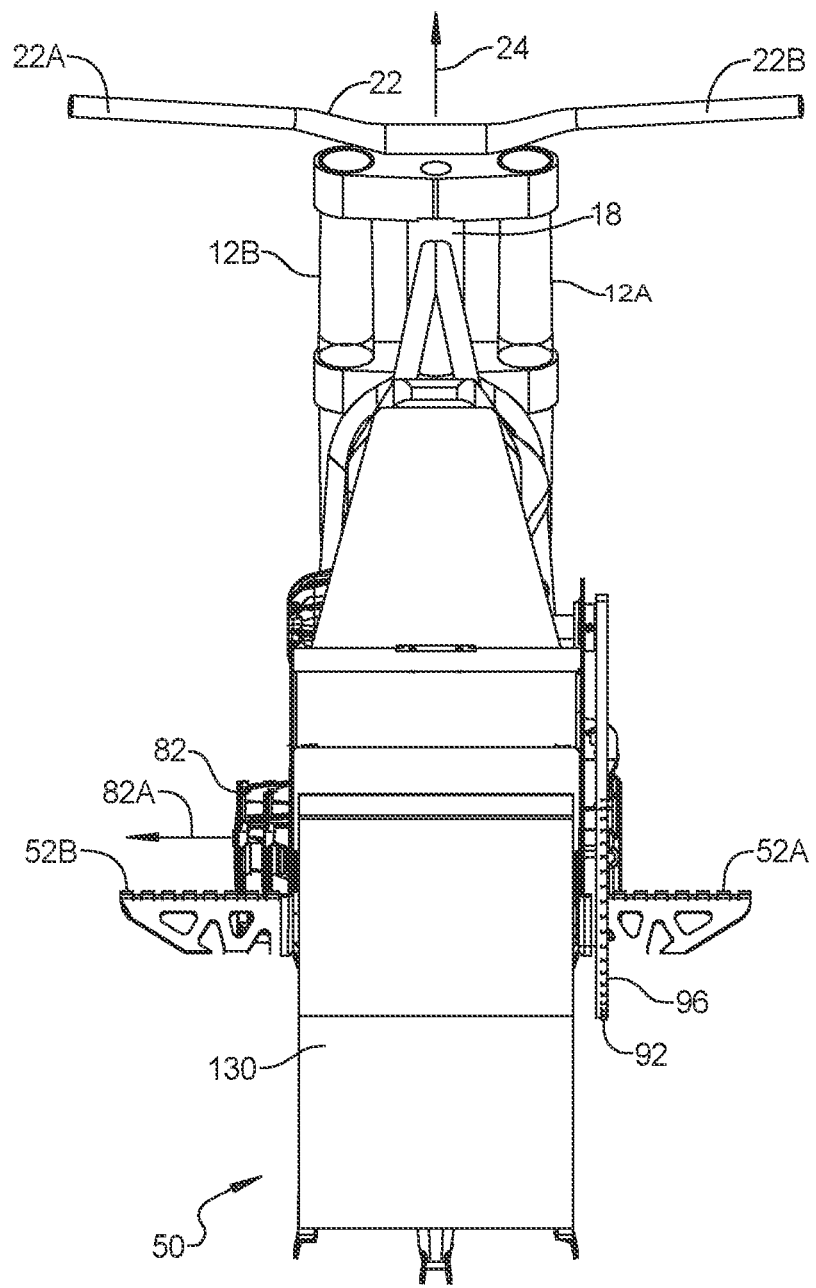
FIG. 8 is a rear side view of the snow vehicle according to the present disclosure.
Figure 9:
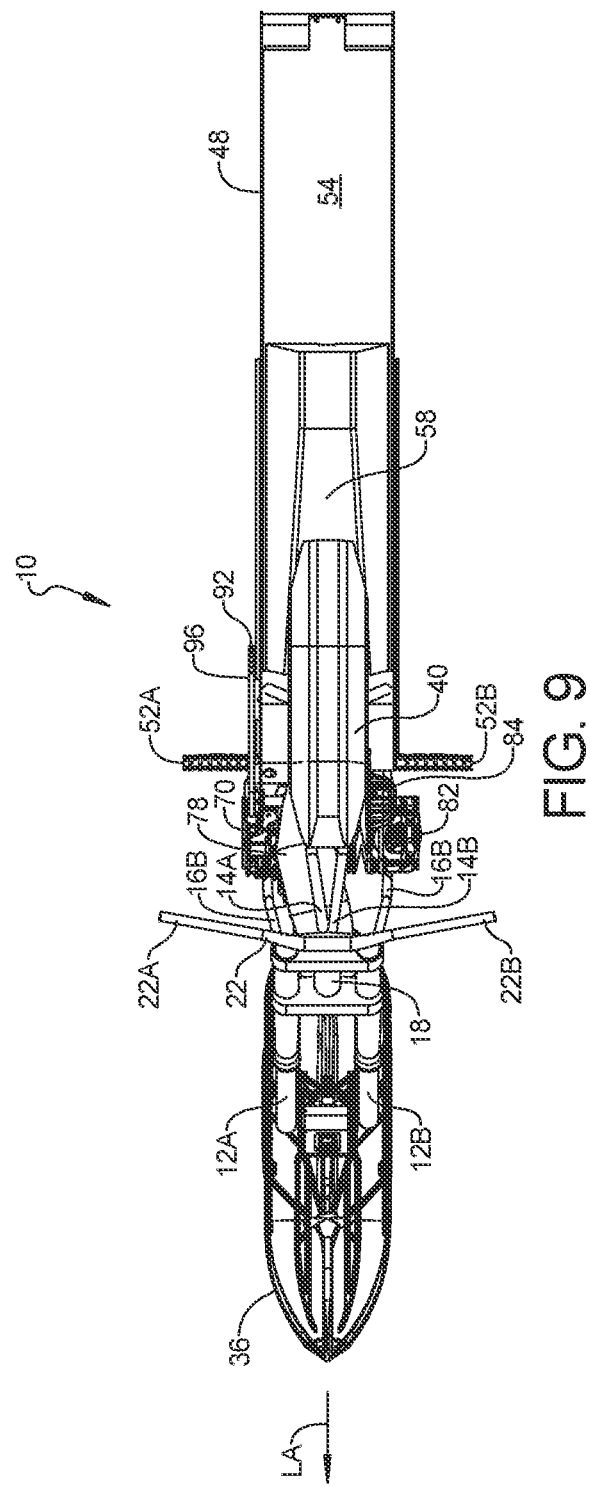
FIG. 9 is a top side view of the snow vehicle according to the present disclosure.

As is best shown in FIG. 6, the secondary clutch 84 includes a secondary clutch spindle 88. The secondary clutch spindle 88 and rotates a clutch gear 90. The clutch gear 90 is used to engage a chain 92. The chain 92 is coupled to a driven track shaft 94 through a drive gear 96. Thus, as the clutch gear 90 rotates from the motion of the secondary clutch spindle 88, the chain 92 causes the driven track shaft 94 to rotate within the tunnel 48 through the driven gear 96. The driven track shaft 94 forms a driven track axis that is perpendicular to the longitudinal axis LA of the snow vehicle 10. The chain 92, the drive gear 96 and the clutch gear 90, may, in a vehicle configuration, have a cover (not illustrated) thereover to protect the vehicle operator.

The axis of the crankshaft 72 and thus the position of the engine 70 is relatively low within the vehicle. The crankshaft axis 72 is positioned above the rotational axis of the driven track shaft 94. Thus, the axis of the primary clutch 82A is also above the axis of the driven track shaft 94. The secondary clutch 84A axis is above the driven track shaft 94 and above the rotational axis of the crankshaft 72 and the primary clutch axis 82A. The tuned pipe 78 is positioned between the handlebar axis, the upper frame 14 and the lower frame 16, The axis of the crankshaft 72 is also disposed below the upper surface 54 of the tunnel 48. That is, if the plane of the upper surface 54 is extended forward in the vehicle, the axis of the crankshaft 72 is below. In fact, the axis of the crankshaft 72 is positioned between the plane of the upper surface 54 and the lower frame 16. The engine 70 is positioned between the driven track shaft and the lower frame member 16A and 16B. Also, the engine 70 is positioned between the driven track shaft 94 and the handlebar axis 24. The secondary clutch spindle 88 and thus the axis of rotation of the secondary clutch spindle 88 is positioned between the crankshaft 72 and the driven track shaft 94. The secondary clutch spindle 88 and thus the axis of rotation of the secondary clutch spindle 88 is positioned behind the crankshaft 72 and in front of the driven track shaft 94. The secondary clutch spindle 88 is also located between the tuned pipe 78 and the crankshaft 72. The secondary clutch spindle 88 is also located above the plane of the upper surface 54 of the tunnel 48. Also, the driven track shaft 94 is located in front of the upright frame members 44A and 44B. The secondary clutch spindle 88 is located between the upright frame members 44A, 44B and the handlebar axis 24 and the lower frame members 16A and 16B. The axis of the crankshaft 72, the axis of the secondary clutch spindle 88 and the axis of the footpegs 52A, 52B are behind the handle bars (axis 24) and in front of the axis of the driven track.

The track assembly 50 includes a suspension rail 110 that is used to secure a plurality of suspension members to the side surfaces 56A, 56B of the snow vehicle 10. In this example, a first solid suspension member 112 and second solid suspension member 114 are coupled at mounting points 112A and 114A to the suspension rail 110. A second mounting point of each of the solid suspension members 112 and 114 are positioned on the side surfaces 56A and 56B as 112B and 114B. The suspension mounting points 112A, 114A, 112B and 114B correspond to an axis. The solid suspension members 112 and 114 may be positioned in the middle of the suspension rail 110. The suspension rail 110 may be coupled to a track wheel 116 located at the distil end of the suspension rail 110. The suspension may also have a compressible suspension members 118 and 120. Each of the compressible suspension members 118 and 120 may be mounted to the same axis formed by 112B and 114B. However, the compressible suspension members 118 and 120 may be located or disposed at and end relative to the solid suspension members 112 and 114. That is, compressible suspension member 118 may be mounted to the suspension rail 110 at a compressible suspension mount 118A while the compressible suspension member 120 may be mounted at a compressible suspension mount 120A. As is illustrated best in FIG. 3, track wheels 122 share the common axis 112B with the mounting of the solid suspension member 112 and the compressible suspension member 118. Track wheels 124 share the common axis 114B with the solid suspension member 114 and the compressible suspension member 120. One track wheel 122 and 124 may be located on a first side of the respective compressible suspension members 118, 120 and solid suspension members 112, 114, where a second track wheel 122, 124 may be located on a second side of the solid suspension members 112, 114 and the compressible suspension members 118 and 120. That is, a track wheel 122 and 124 may be located on the right side of the solid suspension member 112 and the compressible suspension member 118 and a second track assembly wheel 122, 124 may be located on the left side of the solid suspension members 112, 114 and the compressible suspension members 118 and 120. A track 130 extends along the bottom of the suspension rail 110 around the track wheel 116 and around the track wheels 122 and 124. The track 130 also extends around the driven track shaft 94 where the belt is rotated by the driven track shaft wheels 132. In operation, the rotation of the crankshaft 72 of the engine 70 turns the axis of the primary clutch 82, which in turn, rotates the secondary clutch 84, which is coupled to the driven track shaft 94 by the chain 92. The driven track shaft 94 rotates within the tunnel 48, which in turn rotates the driven track shaft wheels 132 which cause the track 130 to rotate.

The track 130 has a width $W_2$ which may be less than or about equal to the width of the ski $W_1$. In this manner, the width $W_1$ of the ski 36 flattens a portion of the snow at the front extent of the snow vehicle 10 to allow easier maneuvering of the track 130. The ride characteristics of the snow vehicle 10 are thus improved thereby. The width $W_3$ of the tunnel 48 is greater than the width of the track $W_2$ and greater than the width of the ski $W_1$. $W_3$ may vary over the length of the tunnel, In one example, the tunnel width $W_3$ is slightly narrow toward the front of the vehicle and wider at the rear of the vehicle The width of the engine is $W_4$. The width of the engine $W_4$ corresponds to the largest extent of the lateral width of the engine. A width $W_5$ corresponds to the points where each of the foot pegs 52A and 52B contact the tunnel. That is, the distance between the point where the foot peg 52A intersects the tunnel and the point where foot peg 52B intersects the tunnel is a lateral width $W_5$. There are various ratios that improve the ride and handling characteristics of the vehicle. The width of engine $W_4$ to the foot peg $W_5$ may be between about 0.09 and about 1.1. The track width $W_2$ to the engine width $W_4$ may be between about 0.09 and 1.2. The foot peg width $W_5$ to the engine width may be between about 0.09 and about 1.2. The maximum width of the tunnel $W_3$ may be between about 0.05 inches and 1.0 inches greater than the track width $W_2$. As mentioned above, the track width may vary slightly to be wider at the outlet of the tunnel. In some examples, the tunnel may be between about 0.5 inches and 1.0 inches wider than the track. In other examples, the tunnel may be between 0.75 inches and 1.0 inches wider than the track width $W_2$.

The longitudinal distance between the ski connection bolt 38 and the center of the drive track shaft 94 may be about 38.25" plus/minus 5 inches. This distance provides improved ride and handling characteristics. The longitudinal distance between the ski connection bolt 38 and the driven track shaft 94 may be between about 32 inches and about 33.5 inches As is best illustrated in FIG. 5, a plate 140 extending between the frame members 16A, 16B may be provided to prevent snow from building up around the engine.

Figure 10:
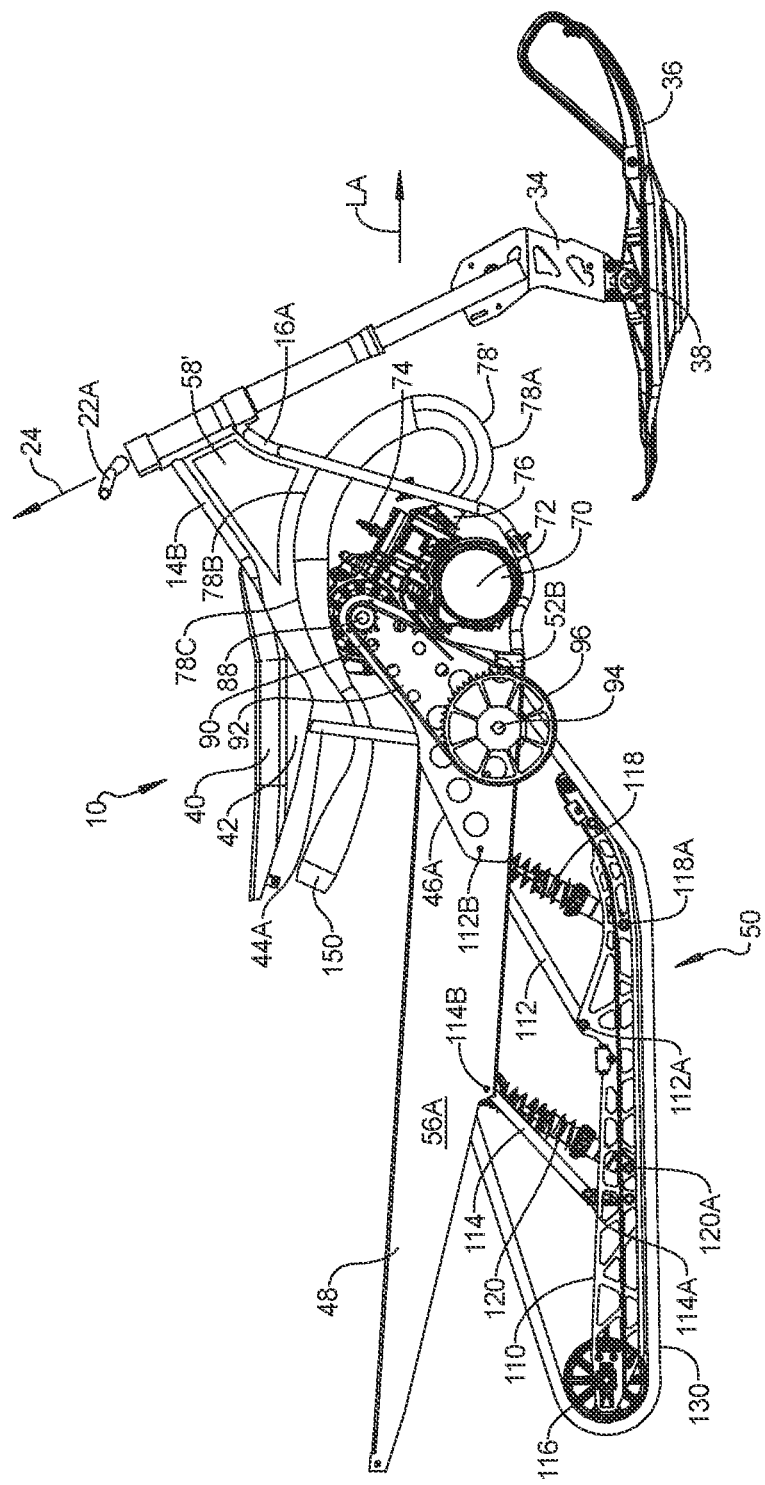
FIG. 10 is a right side view of an alternative example having an alternative fuel tank and tuned pipe geometry.

Referring now to FIG. 10, the same reference numerals are used to illustrate the same components as FIGS. 1-9 above. In this example, however, a fuel tank 58' is located between the fork assembly 12, the upper frame 14 and the lower frame 16. The fuel tank 58' is also located between the secondary clutch 84. In this example, the tuned pipe 78' has been modified to accommodate the fuel tank 58'. The fuel tank 58' may be secured to the first and second upper frame members 14A, 14B, the first or second lower frame members 16A, 16B, or the steering mount 18 or more than one of the same. The tuned pipe 78' may be coupled to a muffler or silencer.

Figure 11:
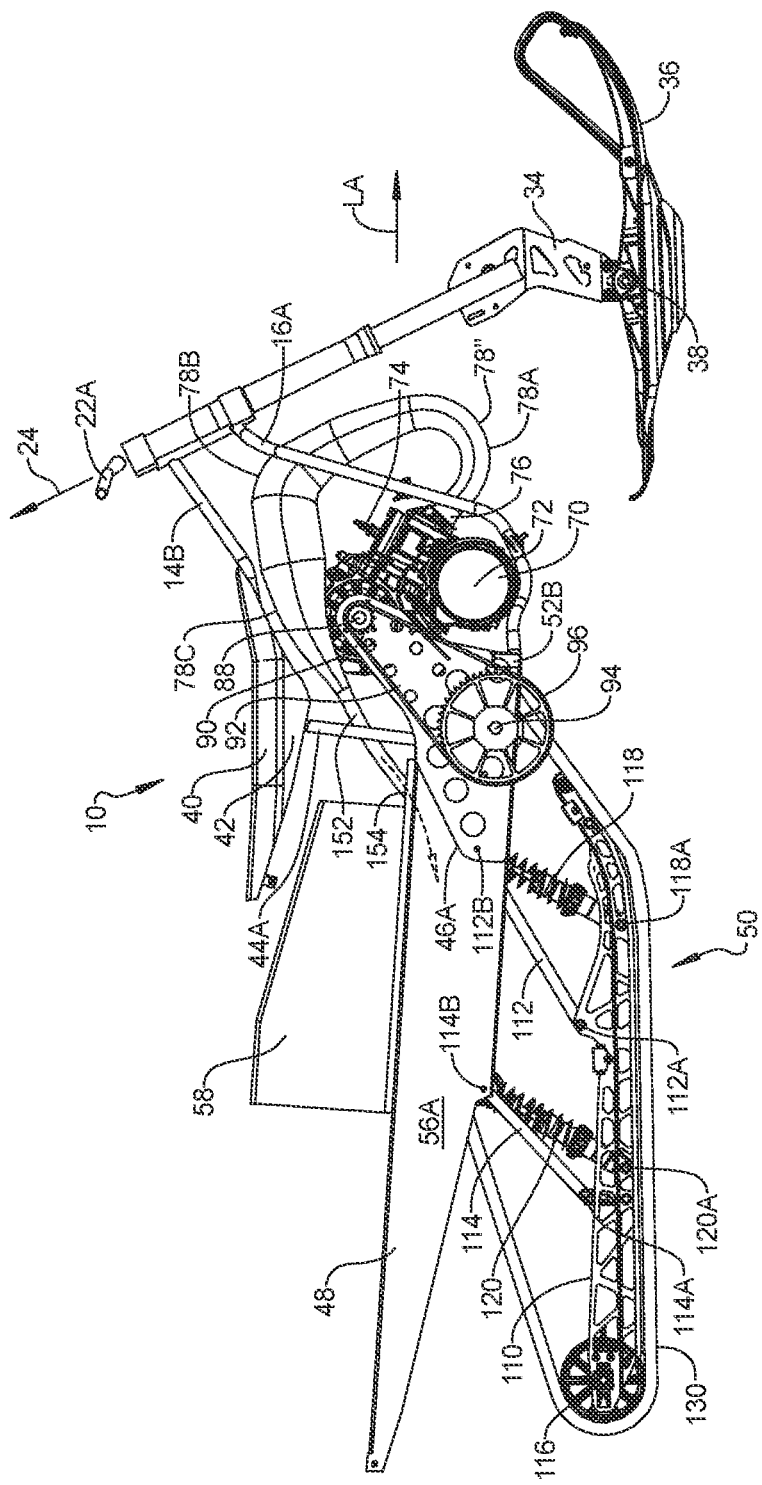
FIG. 11 is a right side view of an alternative snow vehicle having a modified tunnel and tuned pipe.

Referring now to FIG. 11, the tuned pipe 78" has been modified from that set forth above. The tuned pipe 78" includes an extension 152 that couples the exhaust gases into the tunnel 48. That is, a port 154 receives the exhaust gases and allows the exhaust gases to flow under the upper surface 54 of the tunnel 48.

Referring now to FIG. 12A, a right side view of the vehicle 10 is illustrated. In this example, a leg clearance is defined on the side of the vehicle 10. The leg clearance refers to a location for the driver's leg that is free from intrusion by components of the vehicle. The side boundaries are set forth relative to the foot peg 52B. The same, however, is also applicable to the left side of the vehicle centered around the foot peg 52A. In this example, the leg clearance extends from about 4 inches to about 10 inches behind or rearward of the foot peg 52A. Four inches behind the foot peg is denoted by point P1. A second point P2 is 10 inches behind the foot peg 52B. Point P3 is 6 inches in front of the foot peg and point P4 is 10 inches in front of the food peg 52B. All of the points in the center of the foot peg are on a horizontal line H1 parallel to the ground and longitudinally extending when the vehicle is at rest. To determine the leg clearance, a vertical line is drawn at each of the points P1-P4. That is, the vertical lines V1 intersects point P1, vertical line V2 intersects point P2, vertical line V3 intersects point P3 and vertical line V4 intersects line P4. The front most upper rearward leg clearance angle is formed by a ray A1A which is about 15° from the vertical V1. A second ray A1B is 30° from the vertical V1. The upper rear most leg clearance is defined between about 15° at ray A2A and about 30° at ray A2B from the vertical V2. Thus, the upper rear most extent of the upper leg clearance is at a minimum between ray A1A and at a maximum from ray A2B. Of course, the angles may be positioned anywhere between about point P1 and about point P2.

The forward most upper leg clearance angles are defined from vertical lines V3 and V4. The minimum leg clearance angle is about 20° from point P3 illustrated as angle A3A. From point P3, the ray A3B is about 45° degrees from vertical line V3 from point P3. The forward most point P4 has ray A4A at 20° from vertical line V4 and ray A4B at 45° from the vertical V4 and is within the clearance A4B. Thus, any of the rays between A2B and A4B may be used to define the upper leg clearance. At the smallest extent, the leg clearance extends between angle A3A and angle A1A. At the widest extent, the leg clearance extends between A4B and A2B.

Figure 12B:
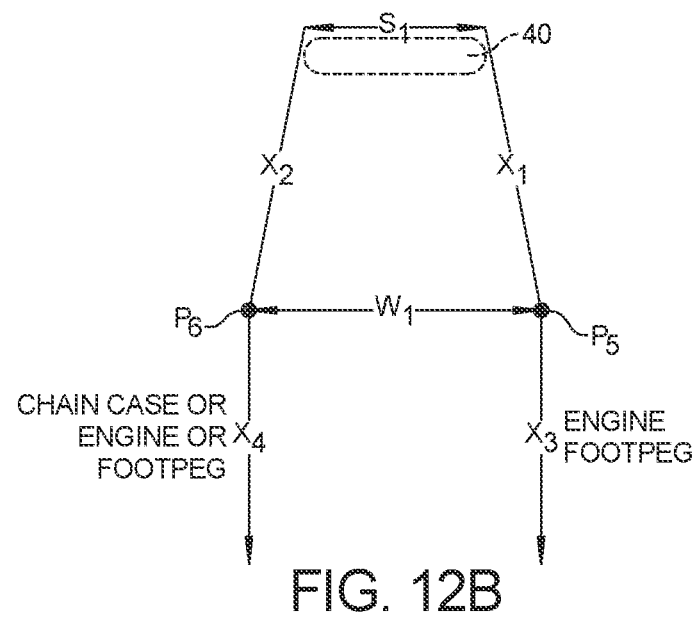
FIG. 12B is a front representation of a vehicle having the lateral aspect of the primary leg position thereon.

Referring now also to FIG. 12B, a plane between the seat width S1 and the engine width or foot peg width P5 on the left side of the vehicle and the chain case, engine or foot peg width P6 on the right side of the vehicle. FIG. 12B is an end view from the front of the vehicle. The seat width S1 may extend between 5 inches and 10 inches centered at about the center of the vehicle. The half plane X1, X2 extends from the foot peg upward and laterally inward and outward from the page. Thus, the extent of the upper leg clearance corresponds to the intersection of the half planes X1, X2 and the ray angles illustrated in FIG. 12. Vertical half planes X3 and X4 extend vertically downward and correspond to the lower extent of the leg clearance defined by the rays A1C, A1D, A2D, A2C, A2D, A3C, A3D, A4C and A4D. Ray A1C is downward and rearward 30° from vertical V1 at point P1. Ray A1D is downward and rearward 45° from vertical V1 at point P1. Ray A2C is downward and rearward 30° from vertical V2 at point P2. Ray A2D is downward and rearward 45° from vertical V2 at point P2. Ray A2D is downward and rearward 45° from vertical V2 at point P2. Ray A3C is downward and forward 30° from vertical V3 at point P3. Ray A3D is downward and forward 45° from vertical V3 at point P3. Ray A4C is downward and forward 30° from vertical V4 at point P4. Ray A4D is downward and forward 45° from vertical V4 at point P4. In a sense, the half plane defined by X2 and X1 extend to the forward most and rearward most boundaries chosen during the design process. Likewise, planes X3 and X4 extend in an amount below the foot peg between two of the rays A2D through A4D. Thus, the area on the rays between the angles corresponds to the leg clearance.

Figure 13:
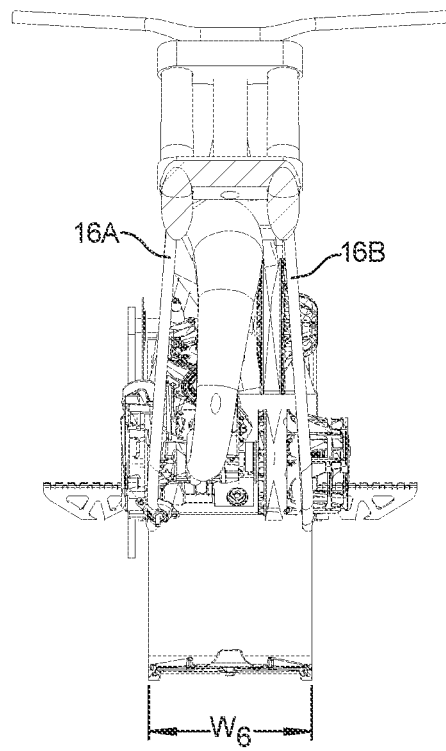
FIG. 13 is a cross-sectional view of the vehicle illustrating the width of the frame.

As is best illustrated in FIG. 13, a cross-sectional view of the vehicle is illustrated along a line 13-13 of FIG. 5. In this example, a width $W_6$ corresponds to the outer extent of the lower frame members 16A, 16B. The width of the frame members $W_6$ corresponds to the width of the ski 36. Preferably, the width of the ski 36 is wider than or equal to the $W_6$. This prevents the ski from entering between the frame members during operation and provides better drivability. For example, the ski width may be about 11.5 inches and the frame width $W_6$ about 11 inches.

Figure 14:
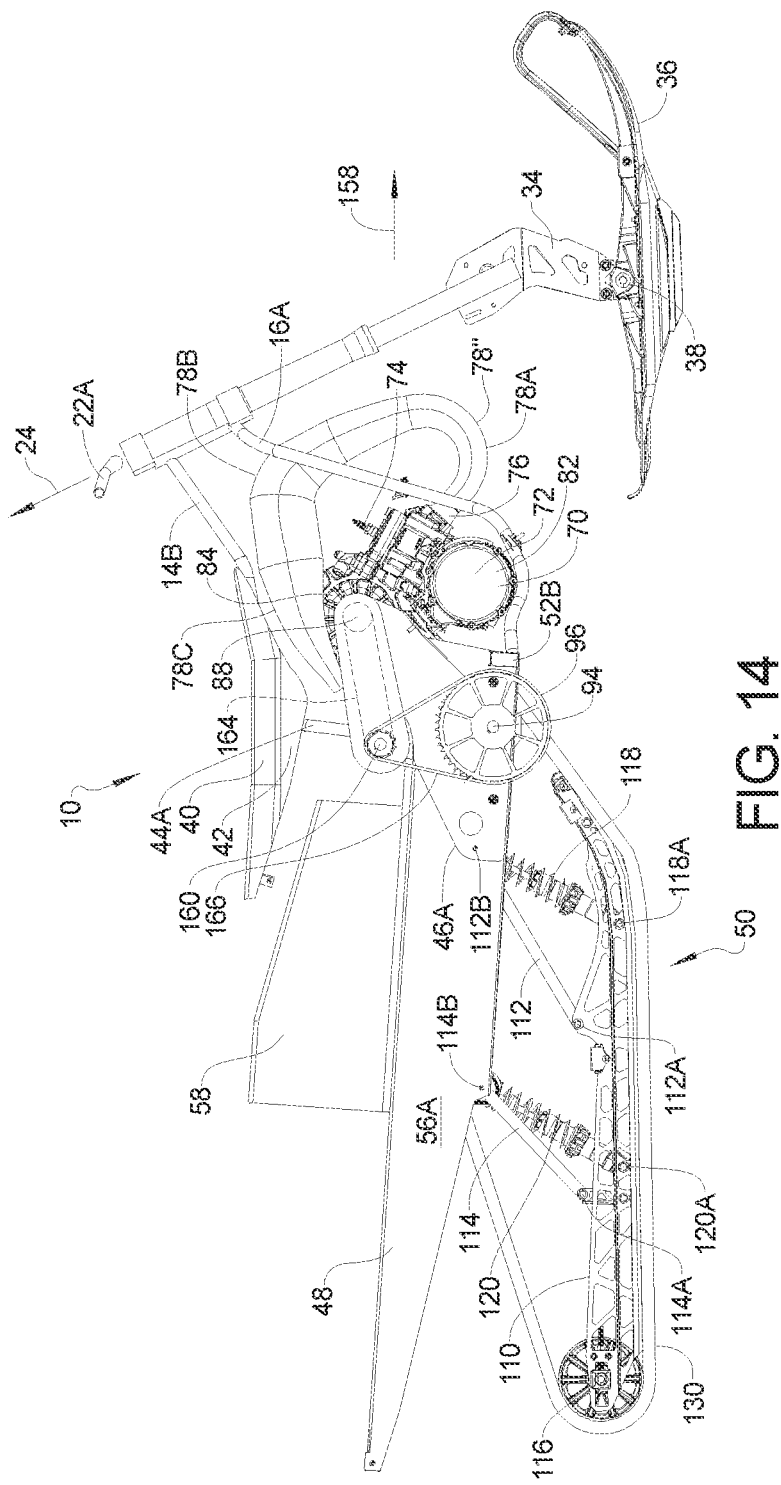
FIG. 14 is a side view of the vehicle having a first example of a secondary shaft.

Referring now to FIG. 14, the secondary clutch 84 may be coupled to the driven track shaft 94 through a secondary shaft 160. The secondary shaft 160 may be a gear driven shaft or belt driven shaft that is communication with the secondary clutch 84 through a gear or belt 164. The shaft 160 may be coupled to the driven track shaft 94 by way of a belt or chain drive 166. In FIG. 14, the center or axis of the shaft 160 is behind the axis of the driven shaft 94.

Figure 15:
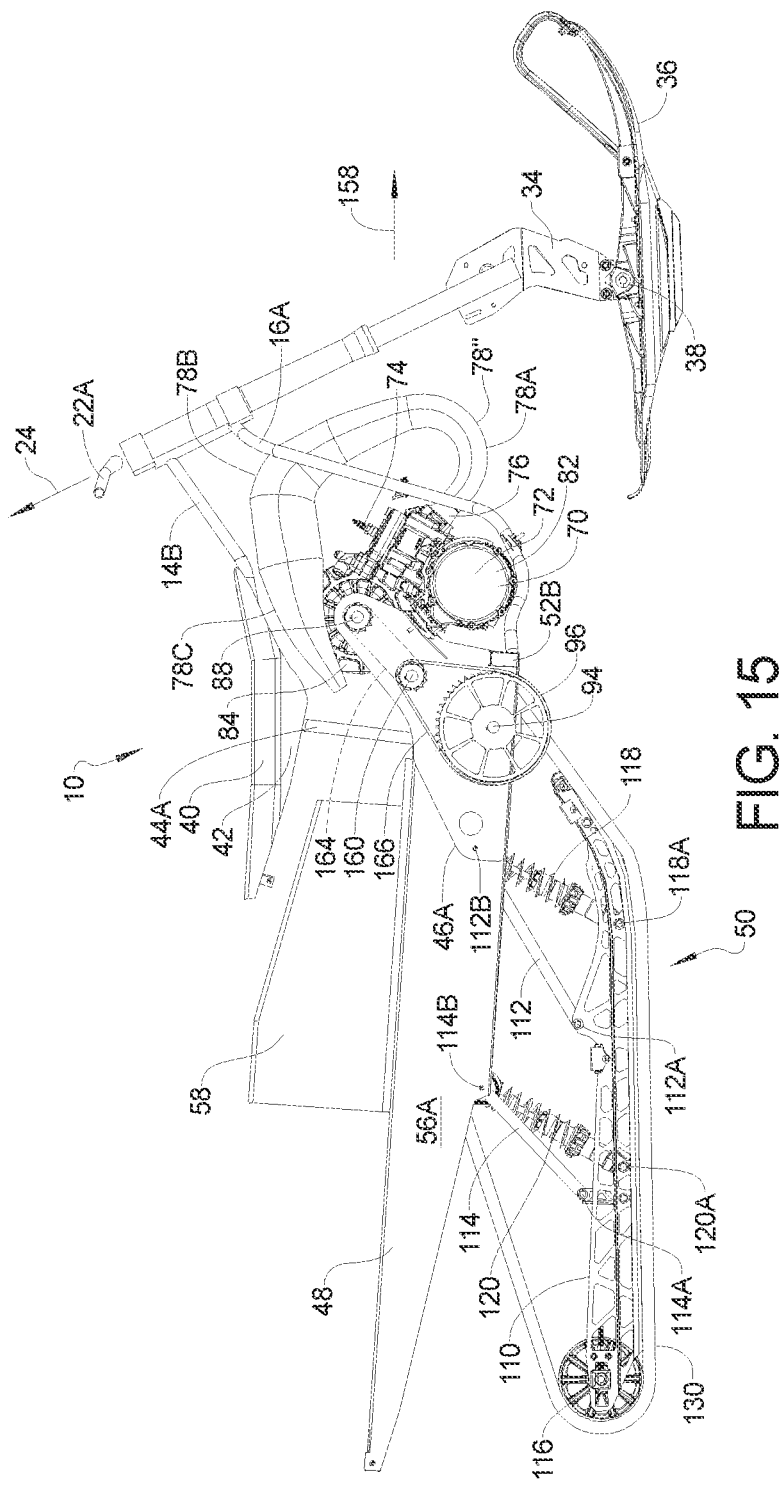
FIG. 15 is a side view of a vehicle having a second example of a secondary shaft.

In FIG. 15, the axis of the shaft 160 is in front of the driven shaft 94. It should be denoted that in front of or behind refers to the normal direction of travel of the vehicle denoted by the arrow 158 which corresponds also to the normal direction of travel of the vehicle.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A snow vehicle comprising:
   a frame assembly;
   a seat coupled to the frame assembly;
   a tunnel coupled to the frame assembly, said tunnel having an upper surface defining a plane; and
   an engine having a crankshaft axis disposed below the plane of the upper surface of the tunnel, said crankshaft coupled to a clutch comprising a primary clutch and a secondary clutch, said primary clutch comprising a first clutch axis of rotation disposed below the plane of upper surface of the tunnel, at least a portion of the primary clutch, at least a portion of the secondary clutch and at least a portion of the engine are disposed directly beneath the seat in a vertical direction, said secondary clutch disposed behind the engine, at least a portion of the engine disposed in front of the seat, the engine further comprises an exhaust port disposed in front of the seat and a tuned pipe coupled to the exhaust port, said tuned pipe having a first curved portion curving the tuned pipe upward after the exhaust port and a second curved portion of the tuned pipe after the first curved portion directing the tuned pipe into a rearward direction, the first curved portion and the second curved portion disposed in front of the seat.

2. The snow vehicle as recited in claim 1 wherein the primary clutch and the secondary clutch are disposed in front of the tunnel.

3. The snow vehicle as recited in claim 1 wherein the secondary clutch comprises a second clutch axis of rotation disposed above the upper surface of the tunnel.

4. The snow vehicle as recited in claim 1 wherein the primary clutch and the crankshaft are coaxial.

5. The snow vehicle as recited in claim 1 further comprising a track disposed within the tunnel, said first clutch axis of rotation is below a portion of the track.

6. The snow vehicle as recited in claim 5 wherein the tunnel about 12 inches wide and the track is about 11.5 inches wide.

7. The snow vehicle as recited in claim 1 wherein the crankshaft axis is disposed in front of the tunnel.

8. The snow vehicle of claim 1 further comprising:
said frame assembly comprising an upper portion and a lower portion, said lower portion having a first width adjacent to the engine; and
a handlebar rotatably coupled to the frame assembly comprising a handlebar axis, said handlebar coupled to said upper portion and said lower portion, said handlebar coupled to a ski, said ski having a second width.

9. The snow vehicle as recited in claim 8 wherein the frame having the first width is adjacent the ski when a ski front suspension is in compression.

10. The snow vehicle as recited in claim 8 wherein the ski comprises only a single ski.

11. The snow vehicle as recited in claim 8 wherein the handlebar comprises a first fork and a second fork coupled to a ski connection bolt.

12. The snow vehicle as recited in claim 8 wherein the frame has a width less than the ski width.

13. The snow vehicle as recited in claim 8 wherein the tuned pipe is disposed completely within the ski width.

14. The snow vehicle of claim 8 wherein the tunnel comprising a driven track shaft and a track rotatably coupled to the driven track shaft within the tunnel, said track having a track width about as wide as the ski width.

15. The snow vehicle as recited in claim 14 wherein the ski comprises only a single ski.

16. The snow vehicle as recited in claim 14 wherein the handlebar comprises a first fork and a second fork coupled to a ski connection bolt.

17. The snow vehicle as recited in claim 14 wherein the frame assembly has a width less than the ski width.

18. The snow vehicle as recited in claim 17 wherein the tuned pipe is disposed completely within the ski width.

* * * * *